P. E. WILLIAMS.
DENTAL BLOWER.
APPLICATION FILED MAY 7, 1907.
900,812.
Patented Oct. 13, 1908.
2 SHEETS—SHEET 1.
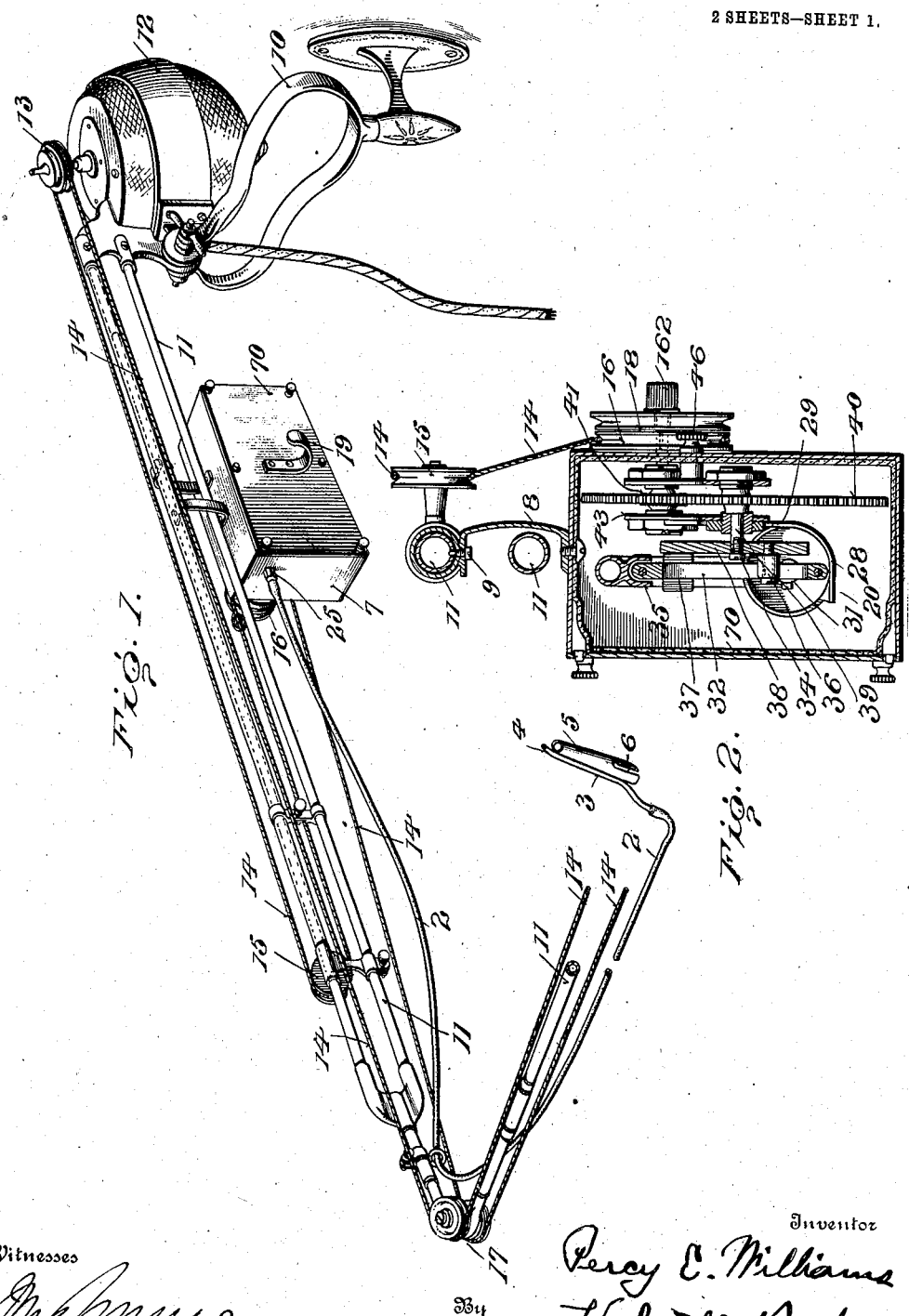

P. E. WILLIAMS.
DENTAL BLOWER.
APPLICATION FILED MAY 7, 1907.
900,812.
Patented Oct. 13, 1908.
2 SHEETS—SHEET 2.
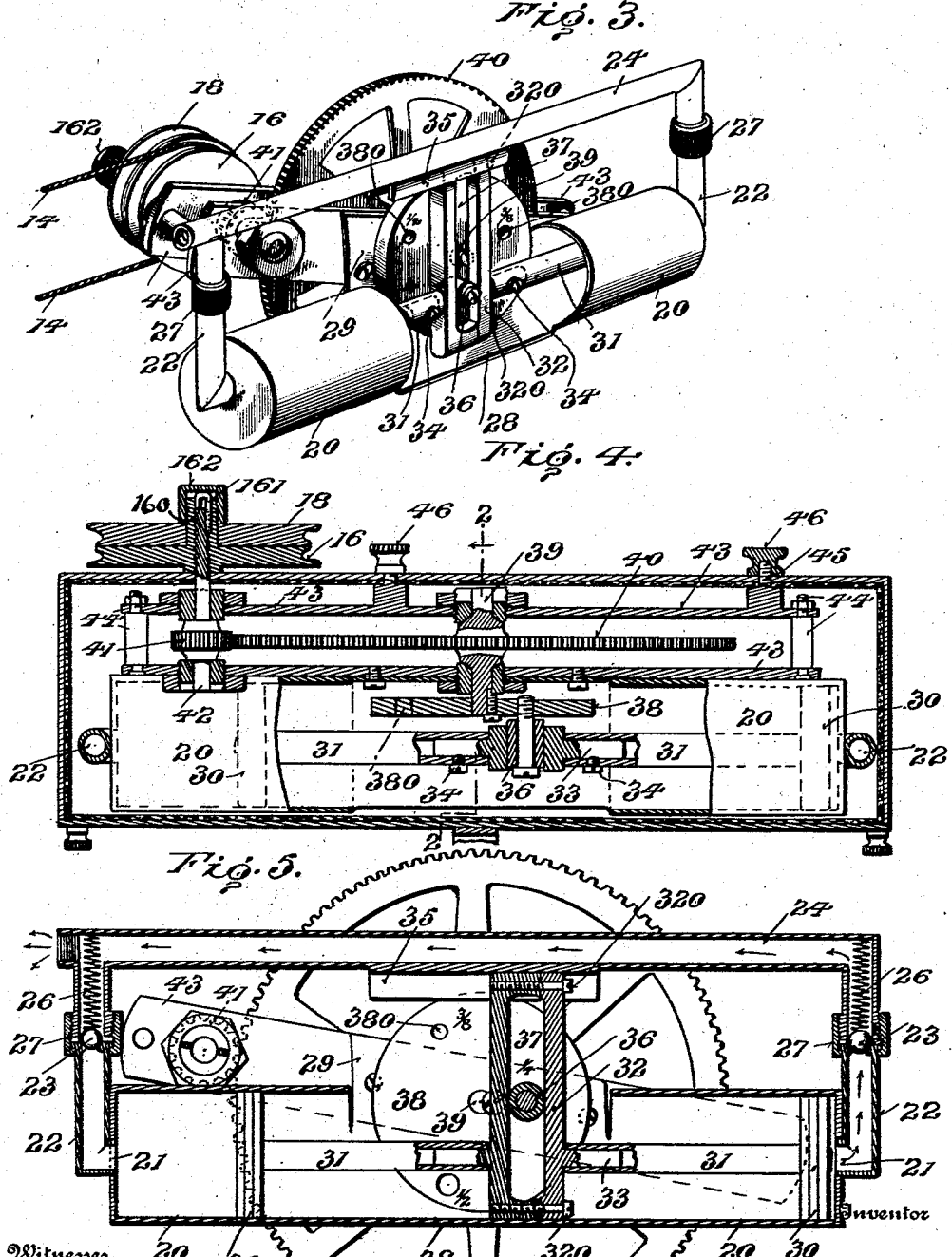
Witnesses
Inventor
Percy E. Williams
By Herbert V. Peck Attorney

UNITED STATES PATENT OFFICE.

PERCY EARL WILLIAMS, OF SAVANNAH, GEORGIA.

DENTAL BLOWER.

No. 900,812.  Specification of Letters Patent.  Patented Oct. 13, 1908.

Application filed May 7, 1907. Serial No. 372,330

*To all whom it may concern:*

Be it known that I, PERCY EARL WILLIAMS, a citizen of the United States, residing at Savannah, Chatham county, Georgia, have invented certain new and useful Improvements in Dental Blowers; and I do hereby declare the following to be a full, clear, and exact description of the invention, such as will enable others skilled in the art to which it appertains to make and use the same.

This invention relates to certain improvements in dental apparatus, and more particularly relates to improvements in what might be termed automatic dental blowers, or chip blowers; and the objects and nature of the invention will be readily understood by those skilled in the art in the light of the following explanation of the structure shown in the accompanying drawings as the preferred embodiment from among other forms and arrangements within the spirit and scope of my invention.

An object of the invention is to provide improved means in compact form which can be suitably secured or otherwise applied to some part of or adjacent to a dental engine, to be operated by the endless belt driven by the engine and driving the dental drill or other tool, to deliver an air blast against the tooth or in the cavity thereof to remove the chips, cool the tooth, cleanse and dry the cavity, or for other purposes.

A further object of the invention is to provide certain improvements in arrangement and construction of parts and elements, whereby a highly efficient and effective dental blower will be produced for delivering an air blast in a tooth cavity during the drilling operation or during other steps or operations involved in dental practice.

The invention consists in certain novel features in construction and in combinations of elements and arrangements of parts as more fully and particularly set forth and pointed out hereinafter.

Referring to the accompanying drawings:—Figure 1, is a perspective view showing a portion of an electrically operated dental engine, with my invention applied thereto. Fig. 2, is a vertical cross section taken in the plane of the line 2—2, Fig. 4. Fig. 3, is a detail perspective of the air compressor and driving parts removed from the box or casing. Fig. 4, is a longitudinal horizontal section through the box or casing and the air compressor therein. Fig. 5, is a longitudinal vertical section.

My invention involves a comparatively small compact closed metal box or casing containing an air compressor with a coupling nozzle or nipple from the air compressor and projecting at the exterior of the box to receive a small rubber or other flexible hose or tube 2, extending to a metal nozzle 3 having a jet discharge end 4, projecting beyond the end of a sleeve 5, on which said nozzle 3 is longitudinally secured. This sleeve can be formed with a bayonet slot 6. This sleeve is adapted to removably slip and fit on the hand piece of a dental instrument, such as a dental drill, with the jet discharge end 5, thereof adjacent to the drill and so arranged as to direct an air blast on the bur of the drill or into the tooth cavity in which the drill is working. The bayonet slot 6, is adapted to receive a lateral projection from the dental hand piece which will enter the lateral inner end of the bayonet slot and thus hold the sleeve against longitudinal movement on the dental instrument during the grinding operation.

I do not wish to limit myself to the particular form of sleeve 5, shown for carrying the air blast nozzle to direct the air blast into the tooth cavity in which the instrument is working, as other means can be employed to detachably connect the dental instrument and nozzle and other forms of air blast nozzles can be employed. For instance when it is desired to heat the air for drying out cavities, or other purposes, the flexible tube can be disconnected from the nozzle 5, and connected to any suitable air heating nozzle, such as an electric air heating nozzle of the type now on the market.

The box or casing, 7, is strongly constructed and is provided with suitable means for securing the same to a part of a dental engine or to some part or fixture adjacent thereto. In the specific example illustrated, I show the box provided with securing brackets in the form of a pair of spaced metal hangers 8, Fig. 5 at their lower ends secured to the box top by screws or other suitable means and extending upwardly therefrom, and at their upper extremities having laterally extending ends or feet (see Fig. 2) engaging the under side of a bar of the engine arm and firmly yet removably secured and clamped thereto by screws 9.

In Fig. 1, of the drawings, I show a portion of a common type of electric dental engine, wherein 10, is the supporting bracket, and 11, is the usually balanced and swinging arm or frame, at one end carrying the electric motor 12, having the driving wheel or pulley 13, receiving and driving the endless cable 14, which extends along said arm to and driving the dental drill or other instrument (not shown) carried by the free end of said arm or frame. The arm or frame is provided with idler wheels or pulleys receiving the driving cable and guiding and maintaining the desired tension thereof. Where my invention is applied to an engine of this type, I usually, as hereinbefore described, rigidly secure the compressor box 7, to and depending from the frame or arm 11, and at a comparatively short distance from the motor 12, and I actuate the air compressor within the box by the driving cable 14, through the medium of a grooved pulley 16, on the drive shaft of the compressor and arranged at the exterior of a vertical side face of the box. The driving cable 14, can be arranged in any suitable manner to drive the pulley 16. For instance, in Fig. 1, I show one ply of the cable looped rearwardly to pass around pulley 16, said ply of the cable extending rearwardly from a cable tightening pulley 15, carried by means adjustable longitudinally of the arm or frame 11, to and around pulley 16, and thence forwardly to a guiding pulley 17, at a point in the frame.

I usually arrange a grooved idler pulley 18, on the compressor drive shaft, and beside the compressor drive pulley 16 and parallel therewith, so that the cable 14, can be slipped from one pulley to the other to throw the compressor into or out of action. I also usually arrange a support, bracket or hook 19, at the exterior of a side face of the compressor box to receive and support the tube and its discharge nozzle when disconnected from the dental instrument.

The air compressor comprises a pair of opposed similar horizontal cylinders 20, open at their inner ends, and closed at their outer ends except for the air outlet ports 21, through the cylinder heads. Each port 21 opens into the lower end of a vertical off take pipe or elbow 22 rigidly secured to the cylinder heads and extending upwardly therefrom. At their upper ends these off take pipes or elbows are fitted with upwardly opening check valves 23. These two pipes 22 discharge upwardly into a compressed air main or pipe 24, arranged longitudinally above the cylinders. This main 24, consists of a comparatively strong or stiff straight length of pipe open and threaded at its discharge end to receive and form a tight joint with the discharge nipple or coupling 25 which is removably screwed thereinto and which projects through an opening in the end of the box to detachably receive the flexible tube hereinbefore described. This longitudinal pipe or main is formed with depending ends 26, detachably coupled to the upper ends of pipes 22, by threaded coupling sleeves 27, and the check valves are usually located within said sleeves and between said pipe ends so that either cylinder can be disconnected from the main 24, through the medium of a coupling sleeve and access can thus be easily had to the check valves and their controlling springs.

The two cylinders 20, are connected together and fixed with respect to each other by the web or longitudinal connecting length 28 between the lower portions of their open ends. Usually the connecting portion or web 28, is formed in one piece with the cylinders, by removing a transverse portion of an intermediate part of a stiff metal tube leaving the two ends thereof to form the cylinders, and a portion of the intermediate part to form the longitudinal connecting web 28, and an upturned flap or supporting flange 29.

Each cylinder contains a suitable reciprocating piston head 30, and these two piston heads are connected together to work simultaneously and to alternately perform their air compressing strokes. Each piston head is secured to a piston rod 31, usually formed by a metal tube. The outer ends of the two straight horizontal rods 31 are secured to a reciprocating cross head 32, whereby the two piston rods and piston heads are secured together to move and reciprocate as one element. The cross head 32, is in the form of a vertically elongated and longitudinally slotted slide each side of which is provided with a projecting rigid lug or pin 33, removably fitting longitudinally into the end of a piston rod 31, and removably clamped therein by a set screw 34. By this arrangement either piston rod can be disconnected and removed for repair or renewal.

The cross head is confined to slide or reciprocate in a fixed plane by a longitudinal guide or slideway 35 rigidly fixed to the under side of the main 24 and depending therefrom, while the lower end of the cross head 32 can if desired, slide on the top face of the connecting web 28.

The cross head 32 is reciprocated by crank pin 36, working in longitudinal slot 37 of the cross head, and carried by and projecting laterally from the face of a crank disk 38 secured on the end of the shaft 39, journaled in and carried by a suitable frame and having a gear wheel 40, rigidly secured thereto. This gear wheel 40, meshes with and is driven by a toothed pinion 41, rigid on the drive shaft 42, also mounted in and carried by said frame and extending to the exterior of the box and there carrying the pulleys 16 and 18 heretofore mentioned.

The frame of the compressor is arranged beside the cylinders and in the specific example illustrated is formed of two strong metal bars or plates 43, arranged in parallelism, and secured rigidly together and spaced apart by suitable means such as bolts and spacing sleeves 44, see Fig. 4. The shafts 39 and 42, pass through these plates 43 and certain journal boxes of any approved construction are provided in the plates for said shafts. The gearing 40, 41 is arranged between said plates.

The cylinders are rigidly secured to and are carried by this frame through the medium of the flange 29, from the web 28, extended upwardly beside the inner plate 43 and rigidly secured thereto by screws or bolts. The crank disk 38 is shown interposed between the reciprocating cross head and the inner plate 43 of the frame.

The plates 43, are arranged longitudinally of the cylinders, and behind the same, but usually have a slight inclination so that access can be had from the front to the journal box or bearing of the shaft 42, as will be seen by reference to Figs. 3 and 5.

The frame, and consequently the compressor, can be rigidly secured in the box by bolts 45 rigid with the rear plate 43, and extending through openings in the rear wall of the box and detachably receiving clamping nuts 46 adapted to screw on the bolts 45 and engage the rear wall of the box. The compressor can be further tightened and held in the box by the shaft 42, projecting rearwardly through the rear wall of the box, and by the coupling nozzle 25 which usually screws against the end wall of the box.

If so desired, means can be provided to increase or diminish the throw or working stroke of the pistons. For instance, I show the crank disk 38 formed with several threaded sockets 380, arranged at different distances from the center of the disk, to detachably receive the crank pin 36. The crank pin can be inserted in any one of these sockets to increase or diminish the throw of the pistons.

If so desired, for the purposes of taking up wear or for other reasons, I can form the cross head 32 of two longitudinal sections, detachably secured and clamped together by screws 320, as shown more fully in Fig. 5.

Any suitable means can be provided for detachably mounting the drive pulley 16, and the idler 18, on the compressor drive shaft 42. For instance, I show the drive pulley 16 formed with an extended hub 160 screwing on the threaded extended end of the shaft 42 and detachably locked thereon to turn therewith by a removable key 161. The idler 18, removably fits and turns loosely on the hub 160 and is confined thereon by a nut 162 screwing onto the extended end of the hub, and also confining the key 161 in place If so desired the front wall 70, of the box 7, can be removable to permit ready access to the compressor for oiling and adjustment, and whereby the entire compressor can be removed from the box on the detachment of the frame thereof from the rear wall of the box.

The operation of the compressor will be obvious to those skilled in the art from the foregoing description of the drawings, and it will also be obvious that comparatively a small amount of power will be required to operate the compressor in view of the extended leverage of the pinion 41 on the cross head 32, through the medium of the large gear 40 and the crank pin 36 which is arranged a comparatively short distance from the axis of said gear.

By the device described I attain almost a continuous blast of air of a comparatively high pressure, amply sufficient to cool a tooth and remove all chips during drilling operations.

The compressor will operate in vertical and horizontal positions, and the box can be secured to various types of dental engines in horizontal, vertical or other positions to be driven by the cable of the engine whether the engine is of the electric or foot power type.

It is evident that various changes and modifications might be resorted to in the forms, constructions and arrangements of the parts described, and that elements might be added, or parts removed, without departing from the spirit and scope of my invention, and hence I do not wish to limit myself to the exact constructions shown.

Having thus described my invention, what I claim as new and desire to secure by Letters Patent of the United States is:—

1. A blower comprising a frame, a pair of spaced opposed alined compressor cylinders having open inner ends and outer end heads, a connecting web between said cylinders having an upwardly extending side supporting flange, said cylinders formed from a tube having its intermediate portion between the cylinders open at the front and top and forming said web and supporting flange, means securing said flange to the frame to support the cylinders, pistons in said cylinders having piston rods, a rotary shaft carried by said means, and operating connections between said shaft and rods to reciprocate said pistons, substantially as described.

2. A blower comprising a frame, a pair of opposed compressor cylinders having a connecting web between their inner ends and a supporting flange from said web secured to said frame and supporting said cylinders, reciprocatory pistons in said cylinders having piston rods, a rotary shaft, means operatively connecting said shaft and rods for reciprocating said pistons, a compressed air main arranged longitudinally of and spaced from said cylinders, air outlet pipes from the cylinders fixed to the outer ends thereof and extending laterally therefrom to said main and in connection therewith constituting a brace for and between the outer ends of the cylinders and carried thereby.

3. A blower comprising a frame, a pair of spaced opposed compressor cylinders having open inner ends and a connecting supporting web between said inner ends, means securing said web to said frame and thereby supporting said cylinders from their inner ends, reciprocating pistons in said cylinders having piston rods extending over said web, a rotary shaft, operative means between the inner ends of said cylinders and connecting shaft and rods to reciprocate said pistons, and a compressed-air-offtake pipe system having a compressed air outlet and comprising a stiff main spaced from and arranged about parallel with said cylinders and lateral stiff pipes fixed thereto and to the outer ends of the cylinders, whereby the outer ends of the cylinders are connected by said pipe system.

4. A dental blower comprising an air compressor supporting frame, a pair of opposed spaced air compressor cylinders having a connecting web provided with a supporting flange between the cylinder ends and secured to said frame and forming the sole support for the cylinders, pistons in said cylinders, means for reciprocating said pistons, and a compressed air main having a discharge and arranged longitudinally of and above said cylinders, and depending compressed air inlet pipes from the cylinders to said main, whereby the cylinders are braced by said main and pipes, substantially as described.

5. A dental blower comprising a frame, a pair of opposed air compressor cylinders arranged beside said frame and fixed thereto, a cross head between said cylinders, means for reciprocating the same, pistons in said cylinders having their piston rods secured to said head, a compressed air main arranged to one side of said frame and longitudinally of and spaced from said cylinders and having a slideway for said head fixed to an intermediate part thereof, said main having an air discharge from one end, and valved air discharge passages from the outer ends of said cylinders to said main.

6. A blower comprising a frame, a pair of opposed compressor cylinders secured to said frame, a connecting web between the inner open ends of said cylinders, a compressed air main spaced from and arranged longitudinally of said cylinders and having lateral valved pipes to the outer ends of said cylinders, reciprocatory pistons in said cylinders having piston rods, a transversely disposed reciprocatory cross head secured to and between the inner ends of said piston rods and having a longitudinal guideway, the opposite ends of said head being arranged at said web and main, respectively, the intermediate portion of said main provided with means maintaining said head to reciprocation in a fixed plane, a rotary crank pin working in said cross head guideway, and means actuating said crank pin to reciprocate said cross head.

7. A dental blower comprising a box adapted to be secured to a dental appliance, a removable air compressor supporting frame secured within said box, an air compressor within the box and carried by said frame, a drive shaft for said compressor provided with and carrying removable driving means at the exterior of the box, a compressed air main carried by the compressor and arranged within the box, and removable means clamping said main to said box and extending to the exterior of the box to receive an offtake pipe, substantially as described.

8. A portable dental blower comprising a compressor supporting and inclosing box having exterior supporting means for attachment to a dental appliance, said box having an opening and a removable section normally secured to and closing said opening, a removable air compressor within said box opposite said removable section and adapted to be bodily inserted in or removed from said box through said opening and comprising a compressor supporting and carrying frame, means removably securing said frame to and within the box, a compressor actuating shaft, a driving member arranged at the exterior of the box, means removably coupling said driving member to said shaft, a compressed air main, and a pipe connection removably coupled thereto and extending to the exterior of the box for receiving an offtake pipe, substantially as described.

9. A dental blower comprising a box adapted to be attached to a dental engine, and having a removable wall whereby the interior of the box can be exposed, a removable frame secured within said box, air compressor cylinders arranged behind said removable wall and beside and fixed to said frame, pistons for said cylinders, eccentric means for reciprocating said pistons and arranged beside said frame and exposed behind said front wall, a shaft mounted in said frame for actuating said eccentric means, driving means at the exterior of the box, means removably and operatively connecting said driving means with said shaft, a compressed air offtake within said box, and a nipple removably connected therewith and extending to the exterior of the box for coupling with a pipe to convey the compressed air to the work.

10. A dental blower comprising a box adapted to be secured to a dental engine, a removable air compressor supporting frame secured within said box, an air compressor cylinder within the box and fixed to and carried by said frame, a piston within said cylinder, piston reciprocating means carried by said frame and comprising a drive shaft provided with and carrying removable driving means at the exterior of the box, a compressed air main carried by said cylinder and removable with said frame, and removable means clamping said main to said box and extending to the exterior of the box to receive an exterior pipe.

11. A dental blower comprising a box having a removable wall, a longitudinally arranged air compressor supporting frame arranged within said box, means removably securing said frame against a fixed wall of said box opposite said removable wall, air compressor cylinders arranged at the outer side of and fixed to and carried by said frame and provided with pistons and piston rods, means carried by said frame for reciprocating said pistons comprising a rotary drive shaft mounted in and carried by said frame and removably projecting through said fixed wall of the box to the exterior thereof, and removable exterior driving means on said projecting portion of said shaft.

12. A dental blower comprising a box adapted to be attached to a dental engine, a removable air compressor frame arranged within said box and secured thereto, air compressor cylinders fixed to and carried by said frame and provided with pistons and piston rods, means carried by said frame for reciprocating said pistons comprising removable driving means arranged at the exterior of the box, a compressed air main from said cylinders arranged within the box and removable with said frame, and a removable pipe connection extending to the exterior of and securing said main to a wall of said box.

13. A portable dental blower comprising a compressor supporting and inclosing box having exterior supporting means for attachment to a dental appliance, said box having an opening and a removable section normally secured to and closing said opening, a removable air compressor within said box and adapted to be bodily inserted in or removed from said box through said opening and comprising a compressor supporting and carrying frame, means removably securing said frame to and within the box, a compressor actuating shaft, a driving member arranged at the exterior of the box, means removably coupling said driving member to said shaft, and a compressed air main adapted to be removably coupled with an exterior offtake pipe.

14. A dental blower comprising an air compressor supporting frame comprising spaced longitudinal bars, a transverse drive shaft mounted in said bars and provided with a driving pinion between the bars, a transverse counter shaft mounted in said bars and provided with a gear wheel between the bars and meshing with said pinion, a crank disk and crank pin beyond said bars on the outer end of said counter shaft, spaced opposing alined air compressor cylinders arranged longitudinally beside said bars and fixed to the outer bar and provided with pistons and piston rods, said crank disk being arranged between said cylinders and said pin actuating said pistons, and a compressed air main connected with and carried by said cylinders.

I testimony whereof I affix my signature, in presence of two witnesses.

PERCY EARL WILLIAMS.

Witnesses:
PERCY H. MOORE,
HUBERT E. PECK.